United States Patent [19]

Meinhold et al.

[11] 4,207,386
[45] Jun. 10, 1980

[54] ELECTROCHEMICAL STORAGE CELL

[75] Inventors: Henner Meinhold, Heidelberg; Wilhelm Haar, Sandhausen; Wilfried Fischer, Neckargemünd, all of Fed. Rep. of Germany

[73] Assignee: Brown, Boveri & Cie Aktiengesellschaft, Mannheim-Käfertal, Fed. Rep. of Germany

[21] Appl. No.: 35,269

[22] Filed: May 1, 1979

[30] Foreign Application Priority Data

May 5, 1978 [DE] Fed. Rep. of Germany ....... 2819583

[51] Int. Cl.² ............................................. H01M 2/00
[52] U.S. Cl. ..................................... 429/62; 429/104
[58] Field of Search ................... 429/62, 61, 104, 102, 429/30, 31

[56] References Cited

U.S. PATENT DOCUMENTS

| | | | |
|---|---|---|---|
| 3,758,337 | 9/1973 | Fally et al. | 429/62 |
| 4,011,366 | 3/1977 | Bones et al. | 429/62 X |

*Primary Examiner*—Anthony Skapars
*Attorney, Agent, or Firm*—Herbert L. Lerner

[57] ABSTRACT

Electrochemical storage cell of the alkali metal and chalcogen type with an anode and a cathode chamber separated by a solid electrolyte wall and confined by a metal wall. A first current collector has an outer sub-part which extends outside the reactant chamber enclosed by the solid electrolyte, and an inner sub-part which extends into the interior of this reactant chamber. The outer sub-part and the inner sub-part are connected to an electrically conducting contact element which melts at a predetermined temperature exceeding the operating temperature of the cell. A second current collector is formed by part of the metal wall which confines the other reactant chamber.

20 Claims, 3 Drawing Figures

ELECTROCHEMICAL STORAGE CELL

BACKGROUND OF THE INVENTION

1. Field of the Invention

The invention relates to an electrochemical storage cell of the alkali metal and chalcogen type with at least one anode chamber to receive the anolyte and a cathode chamber to receive the catholyte, which chambers are separated from each other by an alkali ion-conducting solid-electrolyte wall and are confined, at least in part, by a metal wall, a first current collector is an electrode brought from the outside into the reactant chamber defined by the solid-electrolyte wall, and a second current collector is in part formed by the metal wall.

2. Description of the Prior Art

Rechargeable cells with solid electrolytes are highly suitable for building storage batteries with a high energy and power density. The electrolytes used in the alkali/chalcogen cells are made, for instance, of $\beta$-aluminum oxide, and are distinguished by the feature that the partial conductivity of the mobile ion is very high and the partial conductivity of the electrons is several orders of magnitude smaller. Through the use of such an electrolyte practically no internal discharge takes place, since the partial electron conductivity is negligible and also the reaction substances cannot get through the electrolyte as neutral particles. An example for such a cell is a sodium/suflur cell with $\beta$-aluminum oxide as the electrolyte. It is a further advantage of such a cell that no electrochemical secondary reactions occur during charging. The reason is again that only one king of ion can get through the electrolyte. The current yield, i.e., the Faraday efficiency of a sodium/-sulfur cell, is therefore nearly 100%. In constrast thereto, electrochemical parallel reactions are possible in cells with aqueous electrolytes. In lead storage cells, processes leading to the dissociation of water occur during charging, in addition to the processes responsible for the charging. The Faraday efficiency is here, for instance, about 90% or less. In addition, a lead storage cell continuously loses capacity (self-discharge). Sodium/sulfur cells therefore have considerable advantages over storage batteries with liquid and in particular, aqueous electrolytes.

However, the mentioned advantages are also accompanied by a disadvantage. This is that in a battery of series-connected electrochemical storage cells, the cells with the smallest capacity determine the capacity of the entire battery. If, for instance, a partially discharged cell is incorporated into a battery in which the other cells are fully charged, there is no possibility of bringing this cell up to the same charging state as the other cells, since the latter acquire a high resistance in the charged state and thereby prevent further charging. The consequence thereof is that the capacity of the battery is reduced by the missing amount of charge. In order to compensate for this disadvantage, several cells are first connected in parallel in the assembly of a battery of solid-electrolyte cells. A high voltage is achieved by series-connecting such groups of several parallel-connected cells. Thereby, for statistical reasons, the capacity of the cell groups varies less than the capacity of single cells. In addition, equalizing currents can flow between parallel-connected cells; these take care that after some time, all cells of a group are at the same charging state.

With the present state of the art, however, there is a serious obstacle against such a connection of parallel-connected cells. This is due to the fact that the most frequent cause of failure of sodium/sulfur cells is that breaks or cracks occur in the solid electrolyte. As a result, sodium polysulfides are formed by chemical reactions of sodium and sulfur, i.e., the cell is chemically irreversibly discharged, heat being developed. Such a defective cell no longer delivers voltage and has a very low resistance. As a consequence, the other parallel-connected cells are discharged very rapidly, so that in this manner the entire group fails.

SUMMARY OF THE INVENTION

It is an object of the invention to provide an electrochemical cell in which the current is reduced or interrupted on the anode and/or cathode side as soon as the cell appreciably exceeds its normal operating temperature.

With the foregoing and other objects in view, there is provided in accordance with the invention, an electrochemical storage cell having an anode chamber for an alkali metal anolyte as a reactant and a cathode chamber for a chalcogen catholyte as a second reactant, which chambers are separated from each other by an alkali ion-conducting solid electrolyte wall, with one reactant chamber defined by the solid electrolyte wall and the other reactant chamber confined, at least in part by a metal wall, an electrode as a first current collector extending from outside the reactant chamber defined by the solid-electrolyte wall to the interior of said reactant chamber, and a second current collector formed by part of said metal wall which confines the chamber containing the other reactant, the improvement comprising said first current collector having an outer sub-part which extends outside the reactant chamber and an inner sub-part which extends into the interior of said reactant chamber, with the outer sub-part and the inner sub-part connected to an electrically conducting contact element which melts at a predetermined temperature exceeding the operating temperature of the cell.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawing, in which.

DETAILED DESCRIPTION OF THE INVENTION

Figure 1:
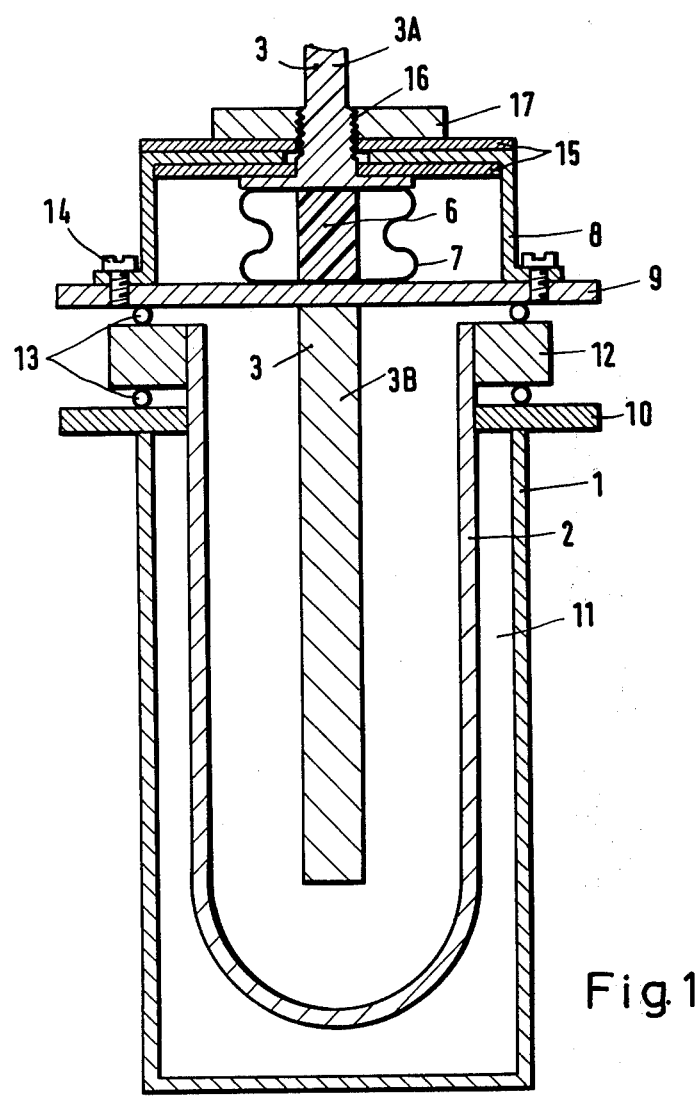
FIG. 1 diagrammatically shows, in a longitudinal cross section, an electrochemical storage cell with a two-part current collector, the parts of which are connected to each other in a conducting manner via a contact element and a spring, throught the cell lid.

In accordance with the invention, at least one current collector consists of two parts, namely, an outer sub-part is connected to an inner sub-part via an electrically conducting contact element which melts at a predetermined temperature above the operating temperature of the cell.

Advantageously, the melting point of the contact element is about 20° to 100° K. above the operating temperature of the storage cell.

In the event that the electrolyte breaks, this temperature is usually reached in the cell after a few seconds, so that the destruction of the solid electrolyte causes the element to react immediately.

In another embodiment of the invention, the outer part of the current collector is in connection with the lid of the cell via the contact element and a spring. Thereby the connection between the spring and the metal wall starts to separate when the contact element begins to melt. This effect is due to the fact that the spring force deforms the melting contact element. Because of the changed length of the contact element, the latter can no longer exert the necessary pressure on the spring, wich brings about an interruption of the circuit in the cell.

Advantageously, the part of the current collector arranged inside the cell is connected directly to the inside of the lid in a conducting manner.

The part of the current collector arranged on the outside of the reactant chamber is designed in the form of a plunger and is held by a bracket which is fastened on the outside surface of the metal wall. The contact element, the spring and the plunger-shaped surface of the part are advantageously arranged between the bracket and the metal wall forming the lid.

The spring has the form of a frame. The contact element is arranged between the spring. Its height is chosen so that the spring is tensioned in this arrangement. The plunger-shaped surface of the current collector is disposed between the surface of the spring and the bracket so that the spring is pressed against the metal wall of the cell lid.

In a further embodiment of the invention, the part of the current collector attached on the outside of the reactant chamber is connected to the metal wall of the lid in a directly conducting manner. The second part of the current collector arranged inside the cell is connected in a conducting manner to the inside of the cell lid. At the end, the part of the current collector which is connected to the contact element, there is an inward-directed recess for receiving the melted contact element.

The part of the current collector extending inside the reactant chamber is fastened to the metal wall of the lid by means of a sleeve.

In another embodiment the metal housing which in part forms the first current collector is connected to the current path via an electrically conducting contact element which melts at a predetermined temperature above the operating temperature of the cell.

If the cell according to the invention appreciably exceeds its normal operating temperature, which can be caused, for instance, by a break of the electrolyte, then the circuit between the parts of a current collector is interrupted by the contact element melting. This gives the cell a high resistance and current will not flow therethrough. However, the current continues to flow through the other parallel-connected storage cells. A short circuit of the still intact parallel-connected cells is thereby avoided and a continuous normal discharge of these cells is ensured from then on.

The embodiments of the invention will be explained in greater detail in the following with reference to the drawings.

FIG. 1 shows the storage cell with a metal wall designed as a cup-shaped metal housing 1 with a metal lid 9, a cup-shaped solid electrolyte 2 of β-aluminum oxide, a current collector 3 consisting of two parts 3A and 3B, a contact element 6, a spring 7 and a bracket 8.

The cup-shaped metal housing 1 is a tube closed on one side, which is made, for instance, of thin-walled alloy steel or of aluminum provided with a protective layer on the inside. The same applies to the metal lid 9. At its open end, the metal housing is provided with a flange 10 which extends inward as well as outward. The cup-shaped solid electrolyte 2 is arranged in the interior of the cup-shaped member 1. Solid electrolyte 2 is a tube of β-aluminum oxide, closed on one side. Its diameter is smaller than the diameter of the metal housing 1. This creates a space 11 between the solid electrolyte 2 and the metal housing 1, which space is designated a reactant chamber and serves to receive a reactant.

The second reactant is contained inside the solid electrolyte 2. The solid electrolyte 2 at its open end, is provided with an outward-extending flange 12, made for instance, of α-aluminum oxide. It rests on the flange 10 of the metal housing 1. A seal 13, preferably an aluminum sealing ring, is placed between the two flanges 10 and 12. The solid electrolyte 2 is closed off by the metal lid 9 which rests on the flange 12 of the solid electrolyte 2. Another sealing ring 13 is disposed between the lid 9 and the flange 12.

The part 3B of the current collector 3 is inside the storage cell and protrudes into the interior of the chamber bounded by solid electrolyte 2. Part 3B is directly connected to the inside of the metal lid 9. Part 3B is a metal rod of cylindrical or rectangular cross section which is resistant to the adjoining reactant in which it is immersed. The end of part 3B connected to the lid 9 can be made in the form of straps and can be screwed or welded to the lid 9 for mounting.

The part 3A of the current collector 3 is arranged on the surface of the metal lid 9. It is bolted to the metal lid by means of screws 14. A spring 7 is arranged between the bracket 8 and the metal lid 9. The spring 7 is bent in the form of a frame. The conducting contact element 6 is set in this frame, formed by the spring 7. The contact element 6 is preferably of cylindrical or square shape. The height of the contact element 6 is chosen so that by placing it within the frame-shaped spring, the latter is tensioned.

Within the space remaining between the spring 7 and the bracket 8, the plunger-shaped surface of the current collector part 3A is arranged. The stem of the part 3A is brought up through a hole in the bracket 8, provided for this purpose.

The contact surfaces of the bracket 8 which are in contact with the current collector 3, are additionally coated with an insulating material 15. The plunger-shaped surface of the current collector 3 sits on the surface of the frame-shaped spring 7 tensionally connected and exerts on the latter and the contact element 6 arranged in between a pressure such that the spring 7 is firmly pressed against the metal lid 9. In order that the part 3A can be connected firmly to the bracket 8, an external thread 16 is cut into the stem part extending beyond the bracket 8. The current collector 3 is tensionally connected to the bracket 8 by means of a locking nut 17, which is provided with a matching internal thread.

The contact element 6 arranged within the frame-shaped spring 7 is preferably made of a metal or an alloy, the melting point of which is desirably 20° to 100° K. above the maximum operating temperature of the cell. In sodium-sulfur cells with an operating temperature of 573° to 623° K., zinc with a melting point of 693° K., and an alloy containing 95% by weight lead and 5% by weight silver with a melting point of 653° K. are suitable substances. As further materials for making the contact elements are lead bromide with a melting point of 640° K., zinc bromide with a melting point of 667° K. and lithium iodide with a melting point of 719° K.

The storage cell according to the invention operates as follows: In normal operation, the storage cell has an operating temperature of 573° to 623° K. A current collector serves the metal housing 1. Another current collector 3, which as described, is made of two parts, with the part 3A outside the cell and the part 3B inside the cell. A break of the solid electrolyte 2 leads to chemical reactions of sodium and sulfur, sodium polysulfide being formed. In this process, the cell heats up further, appreciably exceeding the operating temperature. Unless this process is interrupted, a chemically irreversible discharge of the cell occurs. A cell which has become defective in this manner no longer delivers voltage and has a very low resistance. As a consequence, the other parallel-connected cells are discharged very rapidly, so that the entire group fails. To avoid this, the cell was designed in accordance with the present invention so that the connection between the parts 3A and 3B of the current collector 3 will under such circumstances of a crack or break in the electrolyte be interrupted. In particular, a conducting contact element, the melting point of which is about 650° K. or somewhat above, was arranged between the two parts of the current collector 3. If the defective cell has heated up to this temperature, the contact element 6 begins to melt. The storage cell acquires a high resistance but the current continues to flow only through the parallel-connected intact cells. The operation of the battery is not interrupted.

Figure 2:
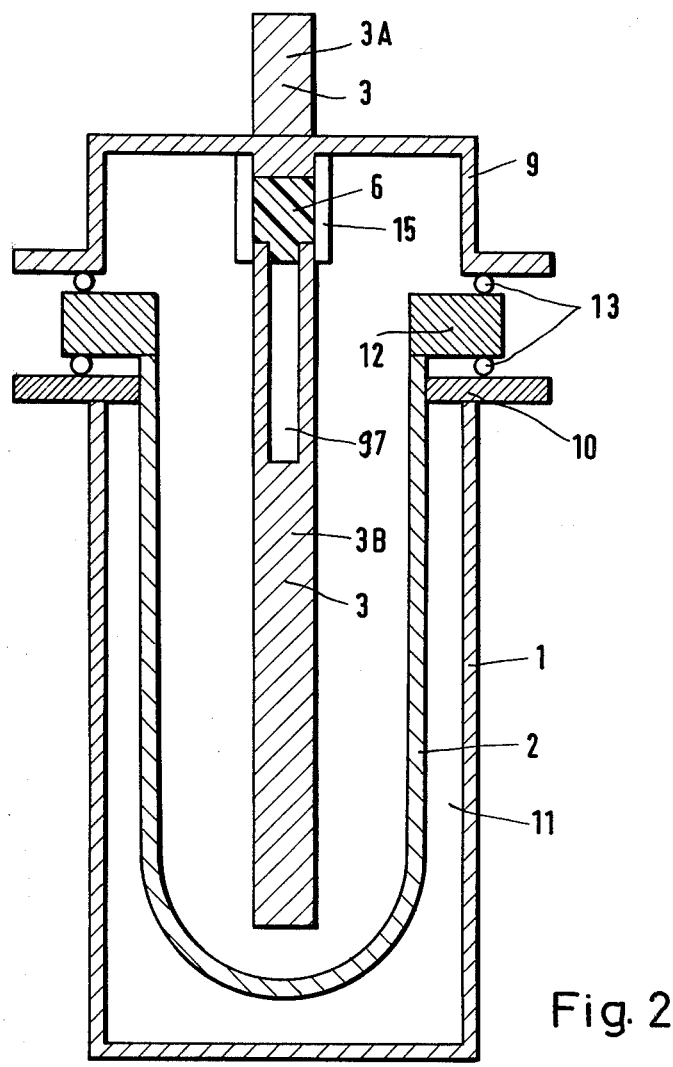
FIG. 2 is a variant of the embodiment shown in FIG. 1, in a longitudinal cross section, and FIG. 3 diagrammatically shows in a longitudinal cross section, an electrochemical storage cell with a current collector which has the form of a pipe clamp arranged around the cylindrical metal housing.

FIG. 2 shows a variant of the storage cell shown in FIG. 1. It likewise is constructed of a cup-shaped metal housing 1, a cup-shaped solid electrolyte 2, a current collector 3 composed of two parts 3A and 3B, a contact element 6 and a metal lid 9. The cup-shaped metal housing 1 has a flange 10 extending inward and outward. On it rests the outward-extending flange 12 of the solid electrolyte 2. Also in this embodiment, the solid electrolyte 2 is arranged within the metal housing. Between the electrolyte 2 and the metal housing 1 there remains a space 11, into which a reactant is filled. The second reactant is enclosed within the solid electrolyte 2. The solid electrolyte 2 is closed off by a metal lid 9. The latter rests on the flange 12 of the solid electrolyte. Between the flanges 10 and 12 of the metal housing 1 and the solid electrolyte 2 as well as between the lid 9 and the flange 12, are respective rings 13 for sealing the reactant chambers from each other and from the outside. The first part 3A of the current collector 3 is directly connected in a conducting manner to the top side of the metal lid 9. The second part 3B of the current collector is arranged in the interior of the cell and extends far into the interior of the chamber bounded by the solid electrolyte. The part 3B of the current collector 3 is connected to the inside of the metal lid 9 in a conducting manner via the contact element 6. The part 3B, at the end adjoining the contact element 6, has a preferably cylindrical recess 97 which points inward and which has a capacity large enough so that the melted contact element can be completely contained therein. The recess 97 is preferably a cylindrical drill hole extending in the longitudinal axis of the current collector 3.

The part 3B of the current collector 3 consists of a metal rod of cylindrical or square cross section. It is made of the same material as the part 3B in FIG. 1. The part 3B is held at the inside of the metal lid 9 by a sleeve 15 of a nonconductive material. The sleeve 15 surrounds the contact element 6 and the end of the part 3B. The sleeve 15 is preferably screwed to the lid 9 and the end of the current collector 3B.

If due to a break of the solid electrolyte, the storage cell heats up to a temperature which is appreciably above its operating temperature, the contact element 6 begins to melt, as it is made, like the contact element of the storage cell shown in FIG. 1, of a metal or an alloy, having a melting point which is above, preferably about 20°-100° K. above the operating temperature of the cell. The melted material of the contact element 6 flows into the recess 97 which is specially provided for that purpose. This brings about an interruption of the conducting connection between the part 3B of the current collector and the lid 9 and between the part 3A of the current collector connected thereto. The circuit of the cell is thereby interrupted and further discharging or charging is no longer possible.

Figure 3:
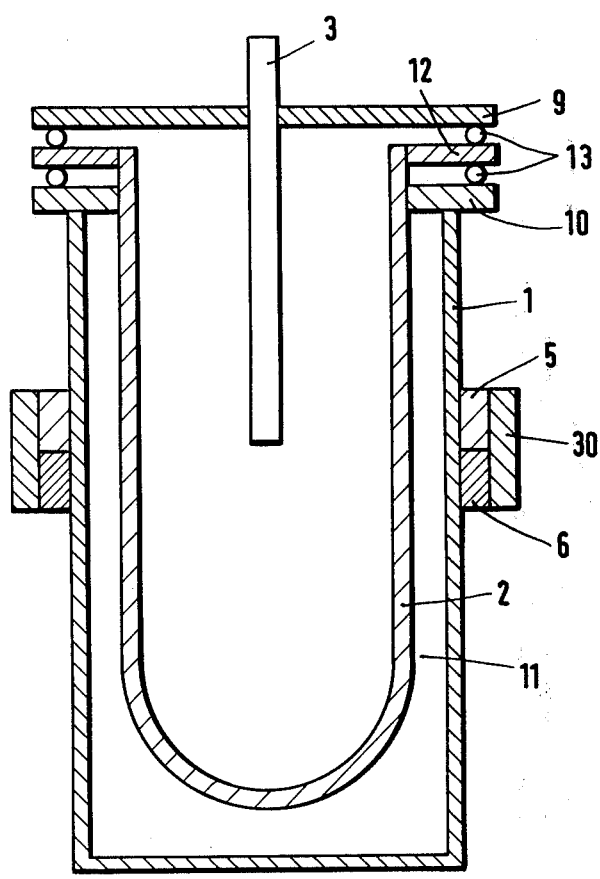

FIG. 3 shows a storage cell with a current collector 30 fastened on the outside of the metal housing 1.

Like the storage cells shown in FIGS. 1 and 2, this storage cell is constructed of a cup-shaped metal housing 1, a cup-shaped solid electrolyte 2 of β-aluminum oxide, two current collectors 3 and 30 and a metal lid 9. Here, too the solid electrolyte 2 is arranged inside the metal housing. The space 11 between the metal housing 1 and the solid electrolyte 2 forms the first reactant chamber, while the interior of the solid electrolyte serves as the second reactant chamber. The metal housing 1 again has a flange 10 extending inward and outward, on which the outward-extending ceramic flange 12 of the solid electrolyte 2 rests. A sealing ring 13 is placed between flanges 10 and 12. The metal lid 9, which rests on the flange 12 of the solid electrolyte, serves to close off the latter. A ring 13 for sealing is likewise arranged between the metal lid 9 and the flange 12. The rings 13 are preferably made of a soft-annealed soft metal, particularly aluminum. The rod-shaped current collector 3 is brought into the interior of the reactant chamber bounded by the solid electrolyte 2 via a feedthrough in the metal lid 9. The current collector 3 is preferably held at the metal lid 9.

The metal housing 1 serves indirectly as the second current collector. A pipe clamp serving as the current collector 30 is placed around the metal housing. The current collector 30 is held at the metal housing by a ring 5 of nonconducting material. Adjacent to the nonconducting ring 5 is an annular contact element 6 of conducting material which forms the electrical connection between the metal housing 1 and the current collector 30. The material for the ring-shaped contact element 6 is a metal of an alloy, having a melting point 20° to 100° K. above the maximum operating temperature of the storage cell. Materials for this purpose are zinc with a melting point of 693° K. and a lead-silver alloy with a melting point of 653° K. Other materials for the annular contact element 6 which can also be used are lead bromide and zinc bromide or lithium iodide.

The operation of this cell is similar to that of the storage cells described in FIGS. 1 and 2. In normal operation of the cell, the current can be taken off via the two current collectors 3 and 30. The cell is charged via the same connections. If, due to a break of the electrolyte and formation of polysulfide, the cell heats up to a temperature which is appreciably above the operating temperature of the cell, such heating will cause the annular contact element 6, the melting temperature of which is preferably maximally 100° K. above the operating point of the cell, to begin to melt. This interrupts the circuit of the cell, and further discharging or charging is no longer possible. The current still flows only in the still intact cells which are connected parallel to this cell.

There are claimed:

1. Electrochemical storage cell having an anode chamber for an alkali metal anolyte as a reactant and a cathode chamber for a chalcogen catholyte as a second reactant, which chambers are separated from each other by an alkali ion-conducting solid electrolyte wall, with one reactant chamber defined by the solid electrolyte wall and the other reactant chamber confined, at least in part by a metal wall, an electrode as a first current collector extending from outside the reactant chamber defined by the solid-electrolyte wall to the interior of said reactant chamber, and a second current collector formed by part of said metal wall which confines the chamber containing the other reactant, the improvement comprising said first current collector having an outer sub-part which extends outside the reactant chamber and an inner sub-part which extends into the interior of said reactant chamber, and the outer sub-part and the inner sub-part connected to an electrically conducting contact element which melts at a predetermined temperature exceeding the operating temperature of the cell.

2. Electrochemical storage cell according to claim 1, wherein the cell has a metal lid and the inner sub-part is directly connected to the inside of the metal lid of the cell and the outer sub-part is connected to the outside of the metal lid via the electrically conducting contact element.

3. Electrochemical storage cell according to claim 1, wherein the melting point of the contact element is 20° to 100° K. above the operating temperature of the cell.

4. Electrochemical storage cell according to claim 2, wherein the outer sub-part of the current collector is in electrically conducting contact with the metal lid of the cell via the contact element and a spring.

5. Electrochemical storage cell according to claim 4, wherein the outer sub-part is held at the metal lid by a bracket.

6. Electrochemical storage cell according to claim 5, wherein the outer sub-part is in the shape of a plunger.

7. Electrochemical storage cell according to claim 6, wherein the plunger-shaped lower surface of the outer sub-part, the contact element and the spring are arranged between the bracket and the metal lid.

8. Electrochemical storage cell according to claim 7, wherein the spring is bent in the shape of a frame in which the contact element is set.

9. Electrochemical storage cell according to claim 8, wherein the metal lid, the spring, the contact element and the outer sub-part are connected to each other in an electrically conducting manner.

10. Electrochemical storage cell according to claim 9, wherein the inner sub-part is directly connected to the metal lid.

11. Electrochemical storage cell according to claim 1, wherein the outer sub-part is disposed on the outside of the metal lid and is directly connected to the metal lid in an electrically conducting manner.

12. Electrochemical storage cell according to claim 11, wherein the melting point of the contact element is 20° to 100° K. above the operating temperature of the cell.

13. Electrochemical storage cell according to claim 1, wherein the inner sub-part is connected to the metal lid in a conducting manner via the contact element and extends into the interior of said reactant chamber defined by the solid electrolyte.

14. Electrochemical storage cell according to claim 13, wherein the melting point of the contact element is 20° to 100° K. above the operating temperature of the cell.

15. Electrochemical storage cell according to claim 1, or claim 11, or claim 13, wherein the inner sub-part, at its end which connects to the contact element, has an inward-pointing recess with a capacity which is slightly larger than the volume of the melted contact element.

16. Electrochemical storage cell according to claim 1, or claim 11, or claim 13, wherein the inner sub-part, at its end which connects to the contact element, has an inward-pointing recess with a capacity which is slightly larger than the volume of the melted contact element, and wherein the inner sub-part is fastened to the metal lid by a nonconducting sleeve.

17. Electrochemical storage cell according to claim 1, or claim 11, or claim 13, wherein the inner sub-part, at its end which connects to the contact element, has an inward-pointing recess with a capacity which is slightly larger than the volume of the melted contact element, and wherein the inner sub-part is fastened to the metal lid by a nonconducting sleeve with the sleeve surrounding the contact element and the end of the inner sub-part.

18. Electrochemical storage cell of the alkali metal and chalcogen type, with an anode chamber for anolyte as a reactant and a cathode chamber for catholyte as a reactant, which reactant chambers are separated from each other by an alkali ion-conducting solid electrolyte wall and are confined by a metal wall housing, wherein a first current collector is an electrode which conductively extends from outside to the metal wall into the reactant chamber bounded by the solid-electrolyte wall and the metal wall housing, and a second current collector extending into the interior of reactant chamber defined by the solid electrolyte wall, the improvement comprising disposing an electrical conducting contact element in electrical conducting contact with the metal housing which forms in part the first current collector, said electrically conducting contact element melting at a predetermined temperature exceeding the operating temperature of the cell.

19. Electrochemical storage cell according to claim 18, wherein the first current collector is formed by the metal housing and a pipe clamp and between them a ring of nonconducting material on the outside of the metal housing and a ring-shaped contact element connected to the metal housing.

20. Electrochemical storage cell according to claim 18, or claim 19, wherein the ring-shaped contact element is made of metal or an alloy, with a melting point which is 20° to 100° K. above the operating temperature of the cell.

* * * * *